Sept. 24, 1957 D. C. LARKIN 2,807,314
SEAT COVER
Filed July 17, 1953 2 Sheets-Sheet 2
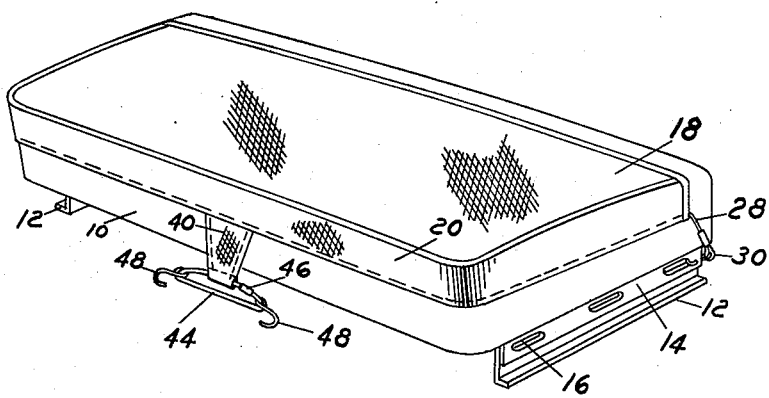
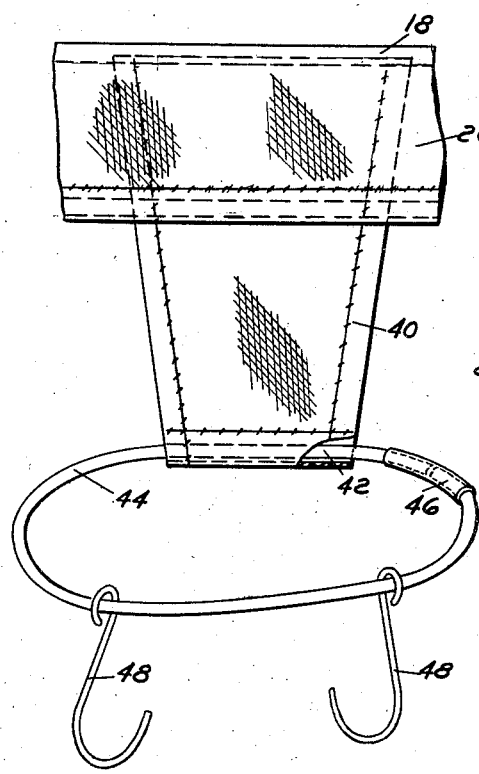
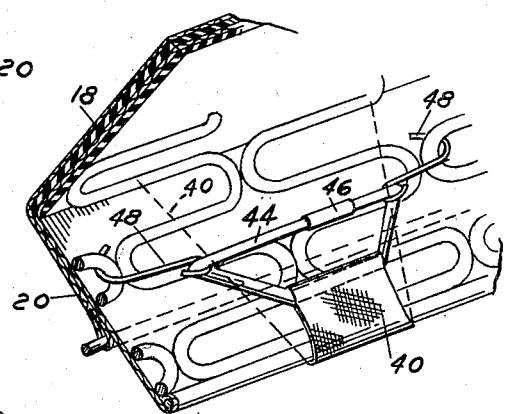
INVENTOR.
DANIEL C. LARKIN
BY
Burton & Parker
ATTORNEYS United States Patent Office 2,807,314
Patented Sept. 24, 1957

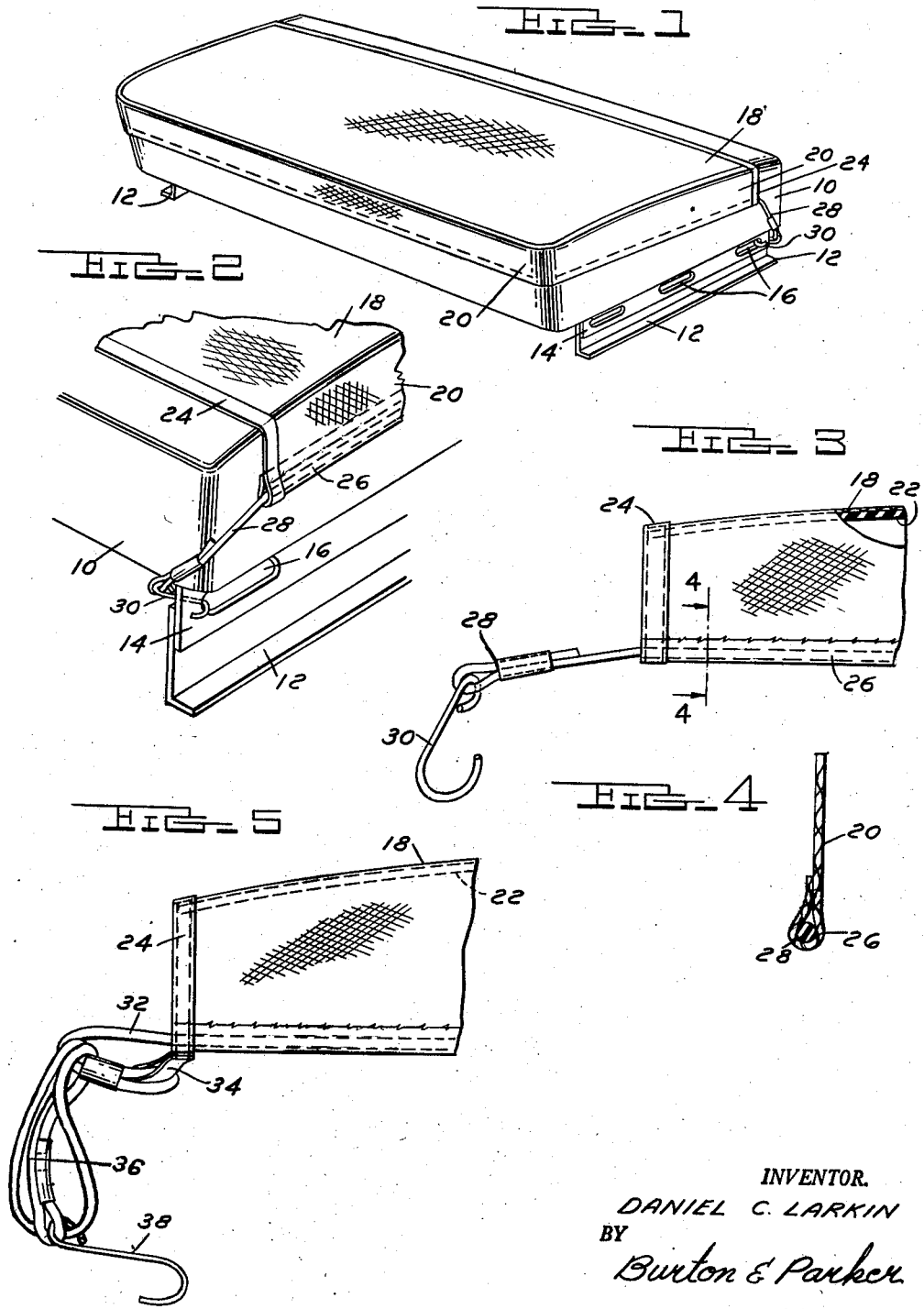

2,807,314
SEAT COVER

Daniel Charles Larkin, Detroit, Mich.

Application July 17, 1953, Serial No. 368,717

4 Claims. (Cl. 155—182)

This invention relates to an improved seat cover and particularly to a seat cover adapted for use with an automobile seat cushion.

This application is a continuation-in-part of applicant's pending application, Serial No. 354,556, filed May 12, 1953, now abandoned.

An object is to provide a cover for an automobile seat which may be quickly releasably secured in place over or removed from the seat.

A further object is to provide a seat cover of the character described which is held securely in place over the seat cushion and is stretched taut thereover and which presents a neat and unwrinkled appearance.

More particularly, an object is to provide a seat cover of the character specified which embodies a portion adapted to be stretched over the upper face of the seat cushion and a depending skirtlike portion at both ends and along the front edge of the seat portion and means secured to the skirt adapted to be releasably connected with the seat frame, the spring assembly, or with some portion of the floor of the vehicle to anchor the cover snugly in place.

Specifically, an object is to provide a seat cover of the kind specified in the immediately preceding paragraph wherein a securing cord is associated with the lower margin of the skirt portion of the cover and is provided with attaching means at opposite ends which attaching means are adapted to be releasably connected with suitable anchoring devices to hold the cover in place. An important feature is that the securing cord embodies a resilient portion which is adapted to impose a tension at all times upon the cover tending to hold it snugly to its place upon the seat cushion.

Preferably the skirt of the cover with which the securing cord is associated exhibits a tubular hem along its lower margin and the cord extends slidably through this tubular hem. The opposite ends of the cord extend beyond the cover and are provided with suitable attaching devices. The cord may be resilient throughout its length or it may exhibit a substantially non-resilient portion extending slidably through the hem and be provided with resilient end connections. Such connections are preferably coupled not only with the cord but with the fabric of the cover itself and are adapted to impose an equalized strain on the cover tending to securely hold the cover in place and in a taut state free of wrinkles.

In addition to the attachment provided by the ends of the securing cord the cover may be further provided with supplemental securing means disposed at the front of the skirt between the ends of the seat cover and adapted to hold the intermediate portion of the cover taut over the seat.

Other objects, advantages and meritorious features of the invention will more fully appear from the following description, claims and accompanying drawings, wherein:

Fig. 1 is a perspective of a seat cushion of a motor vehicle showing one embodiment of my improved cover associated therewith;

Fig. 2 is a perspective of a rear corner portion of the structure shown in Fig. 1;

Fig. 3 is a fragmentary elevation partly broken away of the rear end of the seat cover shown in Figs. 1 and 2;

Fig. 4 is a cross sectional view taken on the line 4—4 of Fig. 3;

Fig. 5 is a view similar to that of Fig. 3 but showing a modified form of securing cord;

Fig. 6 is a view similar to Fig. 1 but showing the cover provided with supplemental securing means;

Fig. 7 is a fragmentary elevation showing such supplemental securing means; and

Fig. 8 shows the supplemental securing means fastened down to the seat cushion springs.

My improved cover is shown as associated with a seat cushion of an automobile. It is particularly designed for such use. It is so designed that it can be quickly attached to cover a seat cushion of a motor vehicle and so that it will hold its position thereupon against accidental displacement or against wrinkling or disarrangement throughout normal use. It is obvious, however, that if desired, the cover might be adapted to be used in connection with other seat assemblies or with back cushion assemblies of automobile seats.

In the drawing a seat cushion of an automobile is indicated generally by the numeral 10. In Figs. 1 and 6 such cushion assembly is shown as supported by a pair of end supports 12. These end supports are secured to the automobile body floor. This assembly is conventional. The seat cushion assembly itself comprises, as is conventional practice, a spring assembly upon which is superimposed a spring liner, suitable padding and upholstering sheet material overlying the same and secured to the frame of the seat cushion. My invention does not relate to this seat assembly structure per se, but to the cover provided therefor.

The seat cushion assembly 10, shown in Figs. 1 and 6 as supported by upright end support members 12. The cushion assembly embodies a pair of depending end flanges 14, which flanges are secured to the upright rails 12 in any desired manner. These flanges may be cut away to exhibit openings 16 as shown. The seat cover itself comprises an upper seat portion proper indicated by the numeral 18 which has a skirt 20 depending from its forward edge and from the ends thereof. This seat portion 18 is a two-ply piece of material. There is an upper ply which is formed of some suitable hard finished smooth slippery material such as rayon, nylon, or the like, and there is a lower ply 22 secured to the upper ply, which lower ply is preferably formed of sponge rubber or some other similar material. Felt might be used though sponge rubber is preferable. This lower ply exhibits a greater thickness than the upper ply. It provides a cushioning effect. It is secured adhesively or the like to the upper ply. It also exhibits an under surface which is rough and tends to engage and adhere to the upholstery fabric of the seat cushion so as to prevent slidable movement of the cover over the seat cushion. The frictional engagement of the sponge rubber layer with the upholstery cloth of the seat cushion is such that it offers very substantial resistance to slidable movement thereover. This multi-ply specific character of the seat cover is more fully disclosed and claimed in my copending application, Serial No. 354,555 filed May 12, 1953, now Patent No. 2,744,567, granted May 8, 1956.

The skirt portion 20 of the cover assembly may be an integral part of the upper rayon or nylon ply and it may be reinforced at the margin by an overlapping reinforcement strip such as 24 as shown in Figs. 2, 3 and 4. The lower margin of the skirt is folded upon itself and stitched to form a tubular hem 26 and a securing cord extends through such hem.

The securing cord which extends through the tubular hem 26 is indicated in Figs. 1 and 2 by the numeral 28. Such cord is provided at each of its opposite ends with a hook or other connecting means 30. Such hook may be detachably connected within an aperture 16 of the member 14, as shown in Figs. 1 and 2, or at any other place of convenient attachment. The cord 28 shown in Figs. 1 and 2 is a resilient cord and it is of such a length that when the two hooks at the opposite ends thereof are drawn down and connected within apertures 16, as shown, a tension is imposed on the cord and through the cord upon the seat cover drawing the cover snugly about the seat cushion.

The skirt of the cover is drawn down over the two ends and over the front face of the cushion and the seat portion of the cover is stretched taut across the top of the cushion so that the cover exhibits a neat appearance free of wrinkles and is held securely in place. Such a seat cover may be quickly fastened to a seat cushion by any person desiring to use the same. Due to the fact that the cover exhibits a lower ply portion of sponge rubber over the top of the seat cushion itself the cover can be held securely in position by this simple attaching cord. It is also to be noted that the skirt 20 of the cover extends down part way over the front face and the ends of the cushion and that the cord is drawn about the front face and the ends of the cushion along a line intermediate the upper and lower edges of the cushion assembly and at a point where the cushion assembly has sloped rearwardly and downwardly at the front, as shown in Fig. 1, whereby the cover is held securely in position.

The uncovered rear portion of the seat cushion, shown in Figs. 1 and 2, is that portion which normally underlies the back cushions of a full seat assembly. The rear margin of the seat cover will be drawn back somewhat into the joint formed between the seat cushion and such back cushions and will underlie the back cushions.

A modification of the securing cord structure and a preferred embodiment is shown in Fig. 5. This modification embodies a cord 32 which extends through the tubular hem 26 and is slidable therethrough as is the cord 28 hereinabove described. The ends of the cord 32 are provided with loops 34 which loops are secured to the lower rear corners of the end portions of the skirt at each end of the hem as shown in Fig. 5. This cord 32 may be a non-resilient type of cord. When connected with the loop 34 it exhibits, as shown in Fig. 5, a bight portion adjacent each loop and projecting beyond the cover itself.

Freely and slidably secured to this bight portion shown in Fig. 5 is a resilient linking cord 36. This linking cord 36 is doubled upon itself constituting a loop so formed as to carry a hook 38 at one end. The opposite end of the loop is slidably coupled with the bight portion of cord 32 whereby the linking cord assembly 36, while connected with the bight of the cord 32, is slidable thereover. When the hook 38 is coupled to the seat frame or to an anchor post on the floor of the vehicle, the tension on the cord 32 by the resilient linking cord 36 is equalized as between that portion of cord 32 which extends through the tubular hem 26 and the end portion which is attached to the loop 34.

The cord assembly 36 is a resilient cord assembly. It is stretchable and resilient so that it will impose a constant tension not only upon the cord 32 which extends slidably through the hem, but upon the skirt of the cover through the loop 34, as shown in Fig. 5. This tension will also be equalized as between the skirt of the cover and the portion 32 of the cord, whereby the cover will not only be held securely about the seat cushion but the skirt portion of the cover will be stretched taut about the skirt portion of the seat cushion and will be held free from wrinkles.

It has been found that with certain makes of automobile bodies there is a tendency for the front of the cover skirt midway between the ends to ride up on the seat cushion. This result is undesirable and interferes with the fit of the cover over the cushion. In Figs. 6, 7 and 8 the front of the skirt 20 is provided with supplemental securing means in the form of a tab 40 which depends below the skirt midway between its ends. The lower margin of this tab exhibits a tubular hem 42. A resilient cord 44 has its ends connected together as at 46 forming a ring which extends slidably through this hem 42. Two hooks 48 are slidably mounted on this ring cord 44 as shown. These hooks are drawn downwardly and apart and connected with suitable anchorages as shown to stretch the cover over the seat cushion. Such anchorages may be on the floor as shown in Fig. 6 or may be on the springs as shown in Fig. 8.

What I claim is:

1. A cover for an automobile seat cushion comprising a seat portion of flexible sheet material adapted to overlie the top of an automobile seat cushion, a skirt depending from the forward margin and the two end margins of said seat portion of the cover, said skirt provided with a tubular hem extending about its lower margin, a securing cord extending slidably through such tubular hem and projecting beyond the opposite ends thereof, said cord including a resilient portion and anchoring attachments secured to opposite ends of the cord beyond the hem.

2. A cover for an automobile seat cushion comprising a seat portion of flexible sheet material adapted to overlie the top of an automobile seat cushion, a skirt depending from the forward margin and the two end margins of said seat portion, said skirt provided with a tubular hem extending about its lower margin, a securing cord extending slidably through such tubular hem and projecting beyond the opposite ends thereof, the projecting end portions of the cord being each bent upon itself and having its extremity attached to the skirt adjacent to the hem forming a bight portion, a resilient cord folded upon itself forming a multi-ply resilient cord assembly coupled with each bight portion for slidable movement thereover, said multi-ply resilient cord assembly provided with an anchoring hook coupled therewith and slidable thereover.

3. A cover for an automobile seat cushion comprising a seat portion of flexible sheet material adapted to overlie the top of an automobile seat cushion, a skirt depending from the forward margin and the two end margins of said seat portion, said skirt provided with a tubular hem extending about its lower margin, a securing cord extending slidably through such tubular hem and projecting beyond the opposite ends thereof, the projecting end portions of the cord being each bent upon itself and having its extremity attached to the skirt adjacent to the hem forming a bight portion, a resilient cord folded upon itself forming a multi-ply resilient cord assembly coupled with each bight portion for slidable movement thereover, said multi-ply resilient cord assembly provided with an anchoring hook coupled therewith and slidable thereover, the front of the skirt of the cover provided intermediate its ends with a depending flap, a resilient cord coupled with said flap and slidable lengthwise therethrough, the ends of said cord connected together forming a cord loop, and anchor hooks slidably supported upon the cord loop to be extended away from the opposite ends of the loop.

4. A cover for an automobile seat cushion comprising a seat portion of flexible sheet material adapted to overlie the top of an automobile seat cushion and a skirt portion of flexible sheet material adapted to overlie the upper part only of the front and the two ends of the seat cushion, a securing cord extending slidably along the lower margin of the skirt and projecting at opposite ends beyond the opposite ends of the skirt, said cord including a resilient portion and having anchoring attachments at opposite ends, that portion of the skirt which overlies the upper part of the front of the seat cushion provided spaced between the ends thereof with a depending flap, a securing cord extending slidably along the lower margin of the flap and including a resilient portion and having anchoring attachments at opposite ends.

References Cited in the file of this patent

UNITED STATES PATENTS

| | | |
|---|---|---|
| 1,418,940 | Kutschmar | June 6, 1922 |
| 1,771,872 | Brock et al. | July 29, 1930 |
| 1,860,520 | Zink | May 31, 1932 |
| 2,537,100 | Smith | Jan. 9, 1951 |
| 2,568,398 | Johnson | Sept. 18, 1951 |
| 2,581,888 | Schlegel et al. | Jan. 8, 1952 |

FOREIGN PATENTS

| | | |
|---|---|---|
| 423,433 | Great Britain | Jan. 28, 1935 |